United States Patent
Chen et al.

(10) Patent No.: US 9,902,622 B2
(45) Date of Patent: *Feb. 27, 2018

(54) METHOD FOR PREPARING ZIRCONIUM BORIDE AND SYNCHRONOUSLY PREPARING CRYOLITE

(71) Applicant: SHENZHEN SUNXING LIGHT ALLOYS MATERIALS CO., LTD, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN); Shiming Wei, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/416,677

(22) PCT Filed: Nov. 26, 2012

(86) PCT No.: PCT/CN2012/085288
§ 371 (c)(1),
(2) Date: Jan. 23, 2015

(87) PCT Pub. No.: WO2014/015597
PCT Pub. Date: Jan. 30, 2014

(65) Prior Publication Data
US 2015/0183645 A1    Jul. 2, 2015

(30) Foreign Application Priority Data

Jul. 25, 2012  (CN) .......................... 2012 1 0259228

(51) Int. Cl.
C01B 35/04    (2006.01)
C01F 7/54    (2006.01)
C25C 3/18    (2006.01)

(52) U.S. Cl.
CPC ................ *C01B 35/04* (2013.01); *C01F 7/54* (2013.01); *C25C 3/18* (2013.01)

(58) Field of Classification Search
None
See application file for complete search history.

(56) References Cited

U.S. PATENT DOCUMENTS 3,769,185 A * 10/1973 Gomes et al. ................ 205/358
2015/0203978 A1 * 7/2015 Chen ........................ C01F 7/54
205/338

FOREIGN PATENT DOCUMENTS

GB           802071 A  * 10/1958

* cited by examiner

*Primary Examiner* — Guinever S Gregorio
(74) *Attorney, Agent, or Firm* — Jackson IPG PLLC; Demian K. Jackson

(57) ABSTRACT

A method for preparing zirconium boride and synchronously preparing a cryolite is provided which includes the following steps: Step A: placing aluminum in a reactor, heating the reactor to 700-850 degrees centigrade, and adding the mixture of fluorozirconate and fluoborate; and Step B: stirring the reactants for 4-6 hours and extracting the upper molten liquid to obtain a cryolite, wherein the lower substance is zirconium boride. The disclosure has the following beneficial effects: the new zirconium boride preparation method provided herein is simple in preparation flow and the device used, short in preparation period and high in reaction efficiency, the prepared zirconium boride with many contact angles has a large specific surface area and contains a controllable amount of aluminum.

8 Claims, No Drawings

METHOD FOR PREPARING ZIRCONIUM BORIDE AND SYNCHRONOUSLY PREPARING CRYOLITE

FIELD OF THE INVENTION

The disclosure relates to a method for preparing metal borides and more particularly to a method for preparing zirconium boride and synchronously preparing a cryolite.

BACKGROUND OF THE INVENTION

At present, the aluminum electrolysis industry still employs the conventional Hall-Heroult method, electrolyte always takes cryolite-alumina as a basic system, and the currently used electrolytic cell with a prebaked anode mainly uses a carbon cathode. As a carbon cathode cannot wet molten aluminum and suffers from a long-term corrosion from cryolite, to prolong the service life of an electrolytic cell, it is usually needed to coat an inert coating on the surface of the carbon cathode. With an excellent wettability to molten aluminum and a resistance to the corrosion from cryolite, zirconium boride is highly suitable for a coating on the surface of a carbon cathode. For their expensive price, borides of transition metals such as zirconium boride are difficult to be widely applied to the coating on the surface of a carbon cathode at present.

Existing industrial zirconium boride production methods mainly include the following three types:

1: the direct reaction of the metal zirconium with the simple substance boron at a high temperature: $Zr+2B=ZrB_2$;

2: boron carbonization method: zirconium dioxide directly reacts with boron carbide in a carbon tube in the presence of C:

$2ZrO_2+B_4C+3C=2ZrB_2+4CO$, the reaction temperature is 1800-1900 degrees centigrade when the atmosphere in the carbon tube is $H_2$ or is reduced to 1650-1750 degrees centigrade when the atmosphere in the carbon tube is a vacuum atmosphere;

3: vapor deposition method: conducting the following reaction by using $ZrCl_4$ and $BCl_3$ as raw materials with the participation of $H_2$:

$ZrCl_4+BCl_3+5H_2=ZrB_2+10HCl$, the deposition temperature is 8000-1000 degrees centigrade, and a product of an abrasive grade and a product of an electronic grade can be obtained.

Expensive simple substance boron, the industrial yield of which is not high (usually lower than 90%) but the production cost of which is high, leads to the expensive price of zirconium boride and consequentially limits the large-scale industrial production of zirconium boride

SUMMARY OF THE INVENTION

To address the problems existing in the prior art, the inventor has made a lot of research on an electrolyte selection and preparation method, especially on a method for preparing zirconium boride and raw materials for producing zirconium boride, and unexpectedly finds that the problem of the preparation of zirconium boride can be addressed by preparing zirconium boride through the reaction of raw materials of fluorozirconate and fluoborate with aluminum, besides, the use of the low molecular ratio sodium cryolite synchronously prepared by the method as the electrolyte of an aluminum electrolysis system can reduce the industrial electrolysis temperature of aluminum electrolysis to reduce power consumption and overall production cost.

A method for preparing zirconium boride and synchronously preparing a cryolite is provided which includes the following steps:

Step A: placing aluminum in a reactor, heating the reactor to 700-850 degrees centigrade, and adding the mixture of fluorozirconate and fluoborate; and Step B: stirring the reactants for 4-6 hours and extracting the upper molten liquid to obtain a cryolite, wherein the lower substance is zirconium boride.

Preferably, the molar ratio of the fluorozirconate to the fluoborate is 2:1.

Preferably, the fluorozirconate is potassium fluozirconate, and the fluoborate is potassium fluoborate.

Preferably, the fluorozirconate is sodium fluozirconate, and the fluoborate is sodium fluoborate.

Preferably, the cryolite obtained in Step B is a potassium cryolite the molecular formula of which is $mKF \cdot AlF_3$, in which m is 1.2.

Preferably, the cryolite obtained in Step B is a sodium cryolite the molecular formula of which is $nNaF \cdot AlF_3$, in which n is 1.2.

The chemical equation involved in the method is as follows:

$$\frac{10}{3}Al + K_2ZrF_6 + 2KBF_4 = ZrB_2 + \frac{10}{3}\left(\frac{6}{5}KF \cdot AlF_3\right)$$

$$\frac{10}{3}Al + Na_2ZrF_6 + 2NaBF_4 = ZrB_2 + \frac{10}{3}\left(\frac{6}{5}NaF \cdot AlF_3\right).$$

The use of the low molecular ratio sodium cryolites $$\left(\frac{6}{5}KF \cdot AlF_3 \text{ and } \frac{6}{5}NaF \cdot AlF_3\right)$$

prepared using the technical scheme provided herein in the aluminum electrolysis industry can improve the solubility property of aluminum oxide to reduce electrolysis temperature, lower power consumption, increase electrolysis efficiency and reduce overall production cost.

Compared with existing technologies, the disclosure has the following beneficial effects: the new zirconium boride preparation method provided herein is simple in preparation flow and the device used, short in preparation period and high in reaction efficiency, the prepared zirconium boride with many contact angles has a large specific surface area and contains a controllable amount of aluminum, besides, the use of the synchronously prepared low molecular ratio cryolite in the aluminum electrolysis industry can achieve a proper electrical conductivity and improve the solubility of aluminum oxide and consequentially reduce electrolysis temperature, lower power consumption, increase electrolysis efficiency and reduce overall preparation cost; and the method provided herein for preparing an ordinary low molecular ratio cryolite is mild in reaction condition, easy to control, simple in technical flow, complete in reaction and high in the quality of the product obtained.

DETAILED DESCRIPTION OF THE PREFERRED EMBODIMENTS

The disclosure is described below in detail with reference to specific embodiments.

Embodiment 1

One ton of aluminum is weighted and placed in a reactor, the reactor is vacuumized and fed with argon for protection and then heated to 750 degrees centigrade, a mixture consisting of dry potassium fluoborate and dry potassium fluozirconate in a reaction ratio is slowly added into the reactor, wherein the molar ratio of potassium fluoborate to potassium fluozirconate is 2:1, the reactants are rapidly stirred for 5 hours to generate zirconium boride and a potassium cryolite $$\frac{6}{5}KF \cdot AlF_3,$$

then the cover of the reactor is opened, the upper molten liquid potassium cryolite is pumped out using a siphon pump.

When an electrolyte consisting of the potassium cryolite $$\left(\frac{6}{5}KF \cdot AlF_3\right)$$

provided herein and aluminium oxide is used in an aluminum electrolysis industry, the working range of an electrolysis temperature can be controlled between 900-960 degrees centigrade.

Embodiment 2

One ton of aluminum is weighted and placed in a reactor, the reactor is vacuumized and fed with argon for protection and then heated to 750 degrees centigrade, a mixture consisting of dry sodium fluoborate and dry sodium fluozirconate in a reaction ratio is slowly added into the reactor, wherein the molar ratio of sodium fluoborate to sodium fluozirconate is 2:1, the reactants are rapidly stirred for 5 hours to generate zirconium boride and a sodium cryolite $$\frac{6}{5}NaF \cdot AlF_3,$$

then the cover of the reactor is opened, the upper molten liquid sodium cryolite is pumped out using a siphon pump.

When an electrolyte consisting of the sodium cryolite

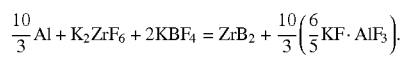

provided herein and aluminum oxide is used in an aluminum electrolysis industry, the working range of an electrolysis temperature can be controlled between 900-960 degrees centigrade.

The above is detailed description of the disclosure with reference to specific preferred embodiments which is not to be construed as limiting the disclosure. The various simple deductions or replacements that can be devised by those of ordinary skill in the art without departing from the concept of the disclosure all fall within the protection scope of the disclosure.

What is claimed is:

1. A method for preparing zirconium boride and synchronously preparing a cryolite, comprising:
   placing aluminum in a reactor,
   heating the reactor to 700-850 degrees centigrade,
   adding a mixture of fluorozirconate and fluoborate; and
   stirring the reactants for 4-6 hours and extracting an upper molten liquid to obtain a cryolite, wherein a lower substance is zirconium boride.

2. The method according to claim 1, wherein a molar ratio of the fluorozirconate to the fluoborate is 2:1.

3. The method according to claim 2, wherein the fluorozirconate is potassium fluozirconate and the fluoborate is potassium fluoborate.

4. The method according to claim 3, wherein the cryolite obtained in Step B is a potassium cryolite the molecular formula of which is $6/5KF \cdot AlF_3$.

5. The method of claim 3, wherein a chemical equation involved in the method is $$\frac{10}{3}Al + K_2ZrF_6 + 2KBF_4 = ZrB_2 + \frac{10}{3}\left(\frac{6}{5}KF \cdot AlF_3\right).$$

6. The method according to claim 2, wherein the fluorozirconate is sodium fluozirconate and the fluoborate is sodium fluoborate.

7. The method according to claim 6, wherein the cryolite obtained in Step B is a sodium cryolite the molecular formula of which is $6/5NaF \cdot AlF_3$.

8. The method of claim 6, wherein a chemical equation involved in the method is

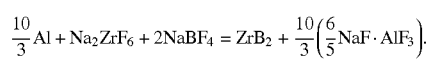

* * * * *